United States Patent [19]
Napier

[11] 3,942,476
[45] Mar. 9, 1976

[54] AUTOMATIC COOP LOADER

[76] Inventor: Alfred Napier, Rte. 1, Farmington, Ark. 72730

[22] Filed: Nov. 14, 1974

[21] Appl. No.: 523,816

[52] U.S. Cl. .................... 119/21; 119/16; 119/82
[51] Int. Cl.² ................................. A01K 31/00
[58] Field of Search ........ 119/21, 20, 16, 82, 14.03, 119/14.04, 19

[56] References Cited
UNITED STATES PATENTS

| | | | |
|---|---|---|---|
| 313,319 | 3/1885 | Goddard | 119/21 |
| 3,460,515 | 8/1969 | Page et al. | 119/14.03 X |
| 3,718,120 | 2/1973 | Schwarz et al. | 119/16 |
| 3,805,741 | 4/1974 | Thompson et al. | 119/20 |
| 3,805,744 | 4/1974 | Jochum | 119/82 |

Primary Examiner—Louis G. Mancene
Assistant Examiner—J. N. Eskovitz
Attorney, Agent, or Firm—Dennison, Dennison, Meserole & Pollack

[57] ABSTRACT

Multiple fence units span a chicken house or the like and herd the animals toward a series of coops provided in a trench extending transversely across the house for selective introduction of the animals into the coops by means of overlying weight responsive traps. The coops are loaded into, supported within and discharged from the trench by underlying conveyor means. The traps are selectively lockable against movement to provide a trench overlying continuation of the floor. Each coop includes an automatic closure operable in conjunction with discharge of the coop from the trench.

13 Claims, 7 Drawing Figures

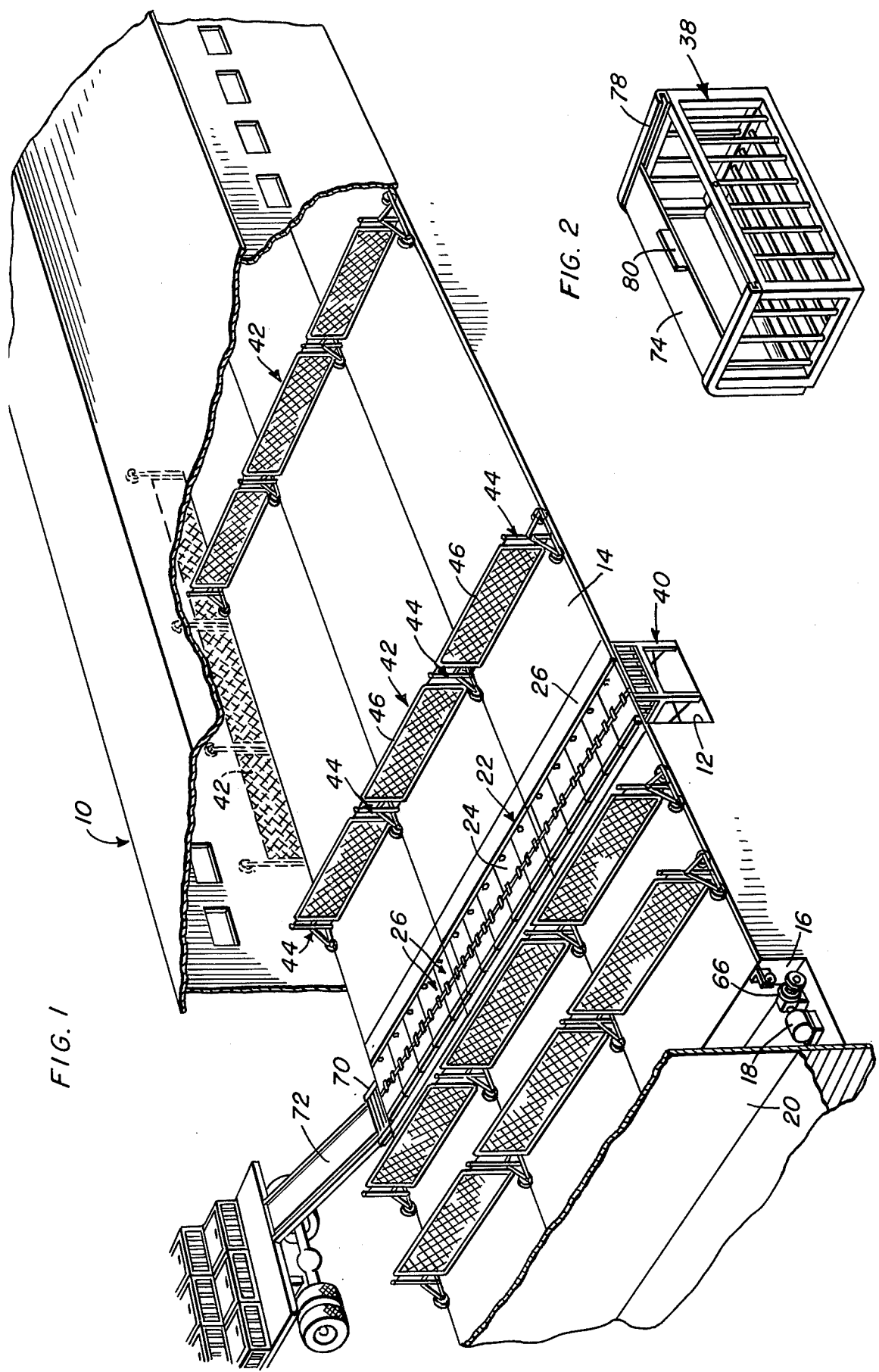

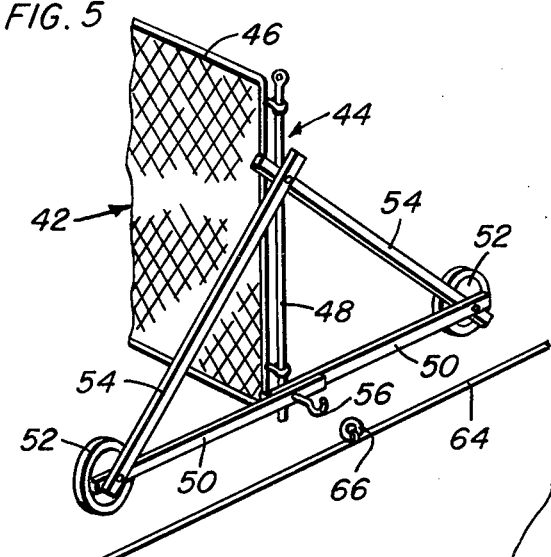
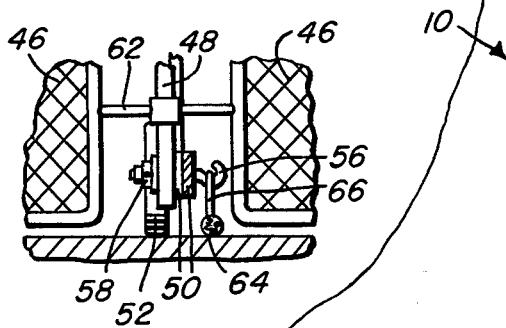
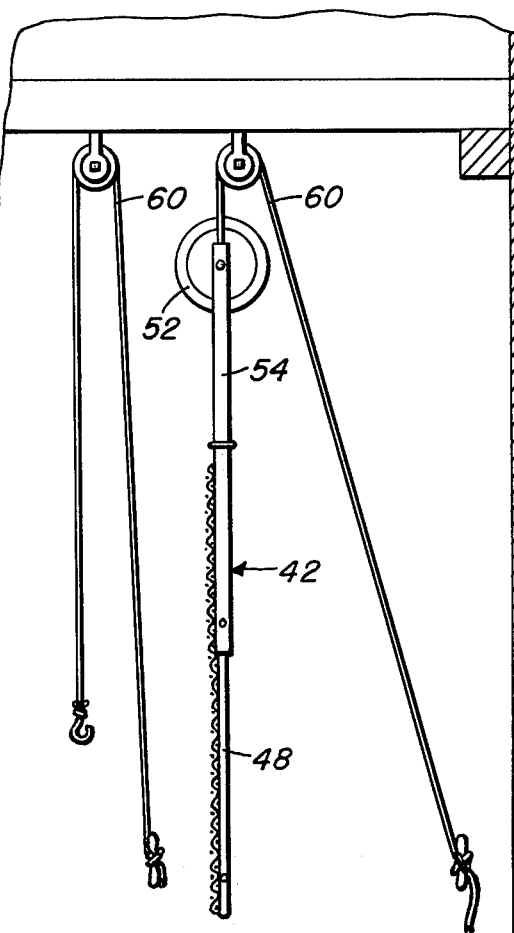
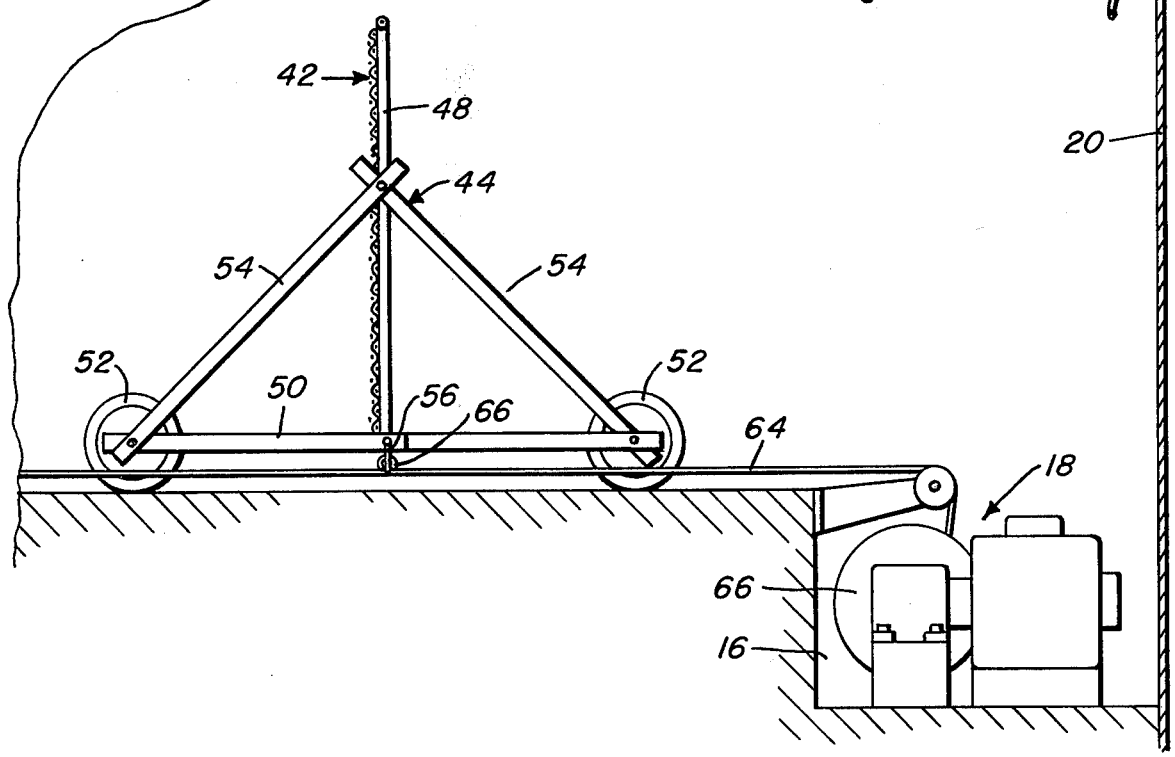

AUTOMATIC COOP LOADER

The present invention generally relates to poultry handling, and is more specifically concerned with a system for catching and loading poultry in a manner which constitutes a significant improvement over procedures presently utilized.

It is a primary object of the invention to provide means for eliminating the hand catching and loading of poultry or the like which, in large operations involving thousands of chickens, can involve many man-hours and frequently results in a high injury rate. The following known patents are examples of prior efforts toward automated poultry handling equipment: U.S. Pat. Nos. 2,648,307; 2,840,041; 3,103,915; 3,110,388; 3,253,577; 3,272,182; 3,420,211; 3,452,718; and 3,602,198. The apparatus detailed herein distinctly differs from and constitutes a significant improvement over prior known systems in every significant area including reduction of personnel required, reduction of time involved in loading great numbers of fowl, substantial reduction in loss of fowl through injury, ease of operation, and adaptability of the system to any conventional enclosure with substantially no modification thereof.

Basically, the system or apparatus of the invention is to be installed within a conventional animal enclosure, for example a chicken house. This installation includes forming a trench across the enclosure toward one end thereof and orientating a conveyor unit along the trench for the accommodation of plural coops, each to be arranged directly beneath a floor level trap. A series of herding fences are positioned along the major length of the house with each fence extending transversely across the house. The fences are simultaneously drawn to the trench and overlying traps with the fowl, as they are herded onto the traps, automatically activating the traps so as to deposit the fowl in the underlying coops. Upon a loading of the coops, the advancing herding fences are stopped, the loaded coops removed and empty coops positioned within the trench. Each coop, as it exits from one end of the trench, is automatically closed prior to loading on a truck bed or the like. The advancing fences, as they move over the traps, will normally be disengaged from the power means which continues to operate the subsequent fences. The fences are collapsable for simplified out of the way storage directly within the house. The traps can be selectively locked closed so as to constitute a solid continuation of the floor during period of nonuse.

These together with additional objects and advantages will become subsequently apparent from the following detailed description of the construction and operation of the invention. Reference is made to the accompanying drawings forming a part hereof wherein like numerals refer to like parts throughout, and in which:

FIG. 1 is a schematic perspective view illustrating the apparatus of the invention mounted in operative position within a poultry house;

FIG. 2 is a perspective view of a poultry coop with an automatic lid thereon;

FIG. 5 is a perspective detail of one end of a herding fence and the associated control cable to be engaged therewith;

FIG. 6 illustrates the power means for controlling movement of the herding fences and overhead storage means for the fences; and FIG. 7 is a detail view of the cable engaging portion of one of the fences.

Figure 3:
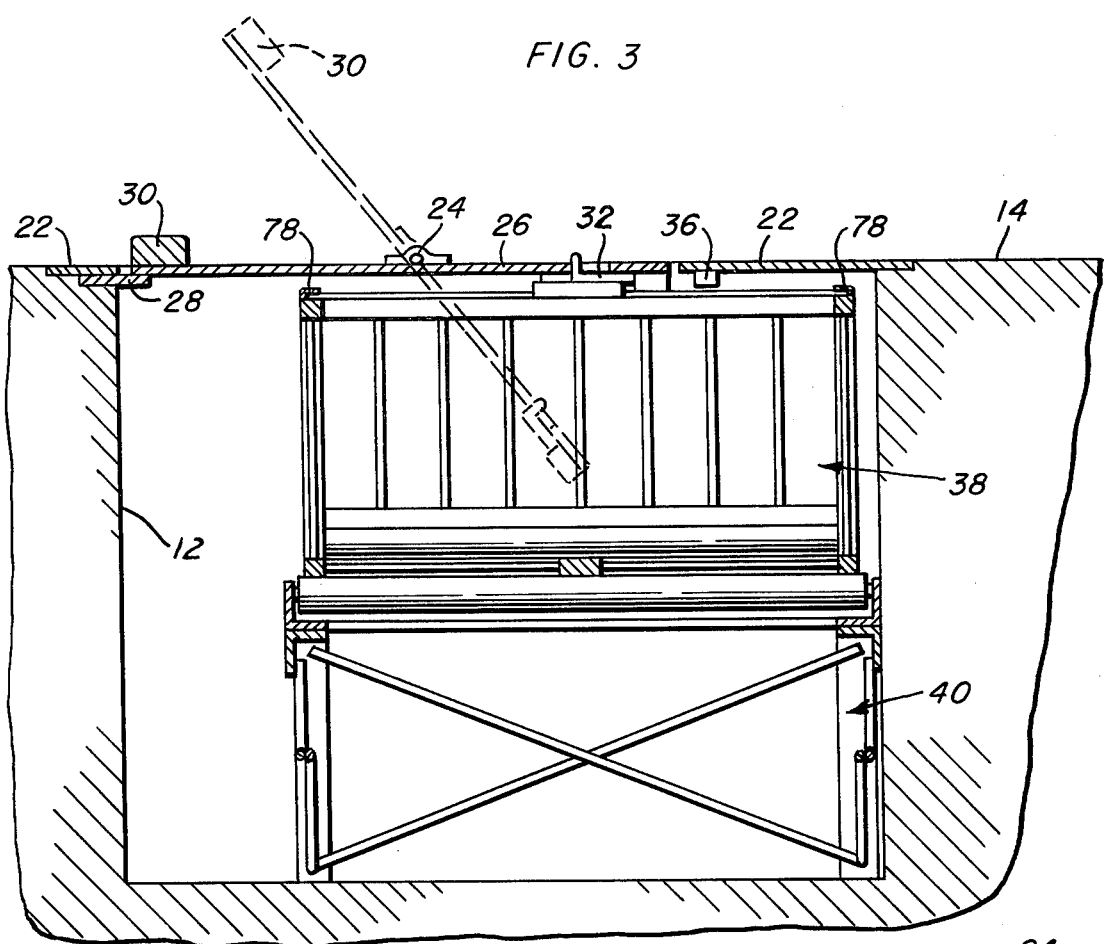
FIG. 3 is an enlarged cross sectional detail taken transversely through the trench received conveyor, coop and associated trap.

Referring now more specifically to the drawings, it should initially be appreciated that while reference will specifically be made to chickens or poultry, the apparatus of the invention can be generally adapted to accommodate other forms of commercially grown animals.

A typical poultry or chicken house 10 has been illustrated in FIG. 1 with the apparatus of the invention installed therein. As will be appreciated, the only significant structural modification to the house 10 for the accommodation of the coop loading equipment is the provision of a trench 12 transversely across the floor 14 toward one longitudinal end of the house 10 with a major portion of the house 10 being to one side of the trench 12. If deemed desirable, a second trench 16 can also be provided at the closer end of the house 10 for the accommodation of the fence moving power unit or units 18. Alternatively, this power equipment can be placed directly on the floor 14 or even in a separate housing immediately outward of the end wall 20 of the house 10.

A rigid floor level frame 22 borders the upper end of the trench 12 and mounts, through a centrally located trench paralleling rod 24, a series of adjacent pivoting traps 26. Appropriate transverse frame spanning braces (not illustrated) can be provided at intermediate points along the length of the trench 12, between adjacent traps, for a stabilizing or rigidifying of the rod 24 should such be necessary.

Each of the traps 26 is in the nature of a flat panel having a rear edge portion, directed toward the short end of the house 10, seated on an inwardly projecting frame mounted ledge or shoulder 28 and biased thereagainst by appropriate weight means 30. In this position, the trap is horizontally orientated and forms a continuation of the floor 14. The trap can be maintained in this position by an appropriate sliding latch or the like 32 mounted at the forward edge of the trap and extensible into an appropriate keeper 36 on the forward portion of the frame 22, that is that portion of the frame directed toward the major length of the house.

A coop 38 is to removably underlie each trap 26 for the reception of poultry therein. A full length roller conveyor table 40 is positioned within the bottom of the trench 12 so as to facilitate the placing, support and removal of the coops 38. It is contemplated that the trench 12 be of sufficient transverse width so as to accommodate personnel so as to facilitate a proper orientation and handling of the coops both prior and subsequent to a loading of the coops.

The actual herding or gathering of the fowl to the traps 26 for introduction into the coops is effected by means of a series of herding fences or fence units 42. These fences 42 span the width of the house 10 and are orientated in spaced parallel relation to each other along the major or forward portion of the house 10 from the front of the trench to the front wall of the house. While the fence structure can vary, the preferred construction illustrated in the drawings includes spaced mobile supports 44 mounting chain link fence sections 46 therebetween. Each mobile support 44 includes a rigid upright 48 and a pair of rigid arms 50 having their inner ends releasably pinned to the lower portion of the upright 48 and projecting both forwardly and rearwardly thereof. The outer ends of the arms 50 mount wheels 52 with these wheel mounting outer ends of the arms being stabilized by diagonal braces 54 pivoted to the forward end portions of the arms 50 and the associated upright 48 at a point along the length thereof upwardly spaced from the inner ends of the arms 50.

Noting FIG. 7 in particular, the inner ends of the wheel mounting arms 50 are releasably pinned to the associated upright 48 by the elongated shank of an outwardly projecting hook 56, the end portion of the shank being threaded for the reception of a mounting nut 58 thereon. Assembled in this manner, and noting FIG. 6, it will be appreciated that each mobile support 48 can be collapsed by a removal of the hook 10 member and upwardly swinging the released arms 50 and wheels 52 about the upper pivotally mounted ends of the braces 54 to allow for a simplified storage of the fences or fence units 42, for example by appropriate overhead pulley mounted suspension systems 60.

Each of the fence sections 46 will be appropriately locked to the adjoining mobile supports 44 in a manner so as to allow easy mounting and removal of the hook pins or bolts 56. This can be effected by appropriate rigid straps 62. In the event the fence sections 46 do not provide for sufficient self-sustaining rigidity between the spaced mobile supports 44 of each fence 42, appropriate rigid rails can be interconnected between the upper and/or lower ends of the uprights 48 of adjacent supports 44.

Simultaneous movement of the spaced fences 42 along the major length of the house 10 is effected by a series of elongated cables 64 which mount, at appropriate spacings, rings 66 releasably engaged by the projecting hooks or hook bolts 56 on the fences or more particularly the fence supports 44. The cables 64, as will be appreciated from FIGS. 1 and 6, extend the full length of the house 10, over the trap covered trench 12 and to the power unit or units 18 which include appropriate cable winches 66. The cable winches can, if so desired, be mounted on a common powered shaft, or alternatively, can each have its own power unit, in which event an appropriate synchronization of the power units will be necessary in order to maintain the parallel orientation of the fences 42 as they are drawn through the house 10.

Figure 4:
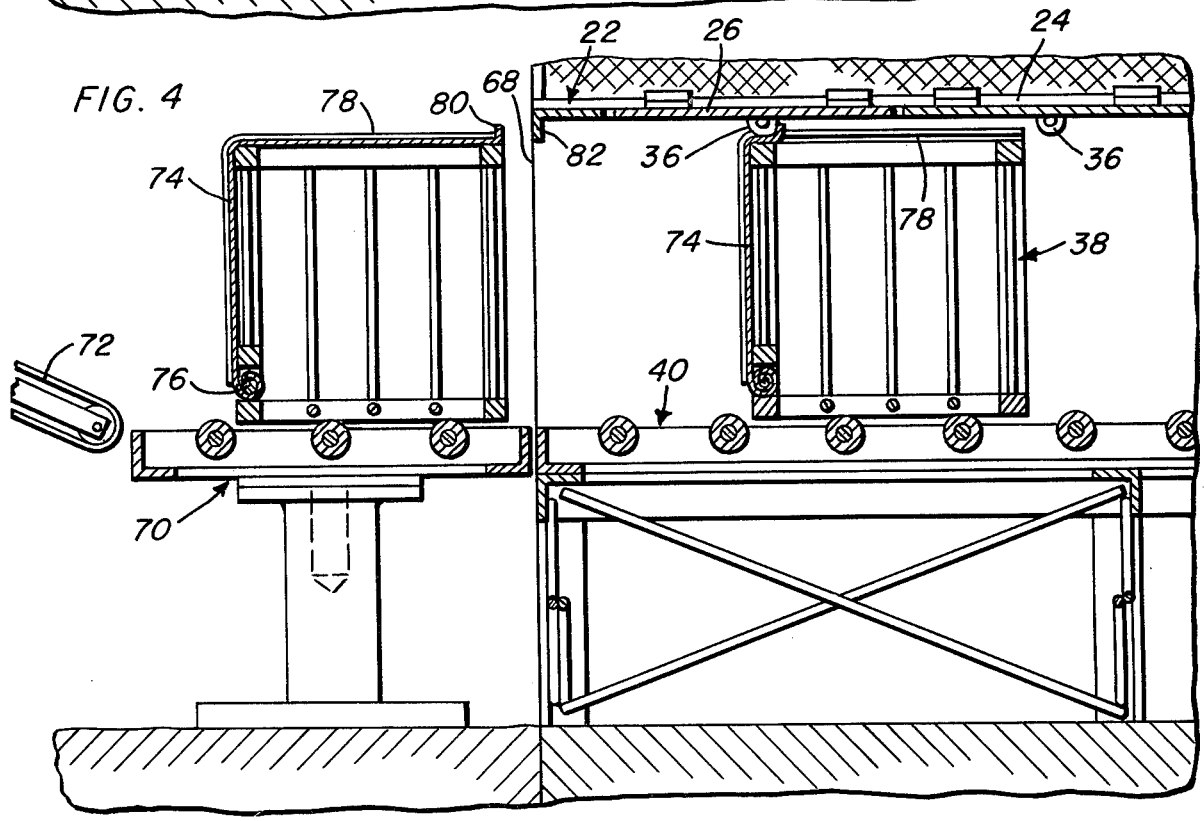
FIG. 4 is a longitudinal cross sectional detail at the discharge end of the trench.

In operation, any fence movement obstructing equipment, such as feeders, waterers, heaters, and the like will be removed, for example by merely utilizing conveniently placed overhead hoist equipment. Coops 38 will be aligned beneath each of the adjacent traps 26, the poultry will be herded toward the forward or major end of the house 10 beyond the trench 12 and the fences are taken from storage, either overhead as illustrated in FIG. 6 or against the side wall as suggested in FIG. 1, and hooked to the control cables 64 in spaced parallel orientation to each other along the house 10 so as to generally divide the poultry into equal segments. At this point any dead or crippled birds can also be removed. The trap latches 32 are then released and the power unit or units 18 activated so as to slowly draw the fences 42 toward the trap covered trench, herding the poultry gently thereto. As sufficient poultry, by weight, gathers on the forward portion of each trap 26 to overcome the counterbalancing weight of the weight means 30, the trap pivots, depositing the poultry within the underlying coop 38. As will be appreciated, the weight means 30 can be varied or adjusted in accordance with the amount of poultry desired within the individual coops. The movement of the fences 42 will of course be controlled whereby the advance thereof will be halted upon movement of sufficient poultry so as to load the coops 38. Upon a loading of all of the coops, such being effected substantially simultaneously, the coops will be moved longitudinally along the supporting roller conveyor toward the discharge end 68, noting FIG. 4, and onto an appropriate outwardly located support table 70 which can be directly communicated with a power elevator 72 for an elevation of the coops to a truck bed or the like. In order to properly confine the poultry within the individual coops 38 as the coops exit from beneath the overlying and poultry confining traps 26, each coop 38 is to preferably be provided with an automatically closing lid. This can, as illustrated in FIGS. 2 and 4, be in the nature of a flexible sheet having the lower portion thereof wound on a roller 76 set in the forwardmost side of the coop 38 with the sides of the sheet engaged within opposed tracks 78 and the forward edge of the sheet having a projecting flange 80 thereon which engages a lip 82 depending from the trench frame 22 as the coop discharges so as to unroll and extend the lid 74 across the top of the coop. An opening of the lid would require a manual rolling thereof back onto the roller 76. Other convenient means can also be provided so as to automatically close each coop as it discharges from the trench. Incidentally, the lip 82, or lid flange 80 will necessarily incorporate sufficient resiliency so as to, upon a full closing of the lid, enable a continuing movement of the coop 38 out of the trench.

Upon a full discharging of the loaded coops from the conveyor table within the trench 12, new empty coops are positioned therein, after which the fences are reactivated and the loading procedure continued. Once all of the poultry contained by one of the fences 42 have been loaded, the fence can either be directly removed or moved over the trench to the short or rear end of the house 10. If necessary, certain individual traps can be locked shut so as to accommodate movement of the fence mobile supports thereover, alternatively, rigid transverse rails can be provided on the trap in alignment with the mobile supports to allow passage of the fence 42. Once beyond the trench, the fence will be disengaged from the control cables 64 so as to not interfere with movement of the remaining fences 42. Once disengaged, the fences can be moved to storage. If deemed advisable, one fence can be retained across the far side of the trench so as to help restrict the advancing poultry to the trench area, although this will most likely not be necessary due to the tendency of the poultry to huddle against the advancing fence. Upon a loading of all of the poultry, and a removal of the final loaded coops, the traps are relocked and the previously removed equipment replaced.

From the foregoing, it will appreciated that a unique system has been devised for effectively and efficiently gathering and loading animals. This gathering and loading is effected automatically and gently requiring, other for the provision of a coop receiving trench transversely across the animal house, no modification of the animal house. The actual equipment utilized is inexpensive, easy to operate and manipulate, and substantially trouble free in nature.

The foregoing is considered illustrative of the principles of the invention and since modifications and changes may readily occur to those skilled in the art, it is not desired to limit the invention to the exact construction and operation shown and described.

What is claimed as new is:

1. For use in an animal enclosure, an automatic loading system, said system comprising trap means located at a point within the enclosure, fence means located remote from said trap means and also within said enclosure, and power means engaged with said fence means for selective movement of the fence along a path of travel toward said trap means for a herding of animals into said trap means, said fence means comprising multiple parallel fences spaced laterally from each other along the path of travel, said spaced parallel fences providing separate herding areas, said power means effecting a simultaneous movement of all of said fences, said trap means comprising a series of individual traps aligned transversely across the path of travel of the fence means, each trap being operative to receive and confine an approximate predetermined number of animals, said trap means further including a coop associated with each trap with the trap defining a closure for the associated coop.

2. The system of claim 1 including a trench transversely across the path of travel of the fence means, said coops being located within the trench, the associated traps overlying the coops and closing the top of the trench, said traps being weight responsive and opening downward into the coops upon movement of a predetermined animal weight thereon.

3. The system of claim 2 wherein said traps are automatically closable upon removal of animal weight therefrom.

4. The system of claim 3 including conveyor means along said trench underlying and supporting said coops.

5. The system of claim 4 including closure means on each coop automatically responsive to movement of the coop along the conveyor means for a closing thereof.

6. The system of claim 5 wherein each fence comprises spaced mobile supports and fence sections supported on and between said mobile supports.

7. The system of claim 6 wherein each mobile support comprises a rigid upright, a pair of rigid arms pinned to the lower portion of said upright and respectively projecting forwardly and rearwardly of the upright along the path of travel of the fence means, wheel means mounted on the outer ends of said arms, and bracing links extending from the outer end of each arm to the upright upward from the lower portion thereof.

8. The system of claim 7 wherein said power means includes elongated cables extending along the path of travel of the fence means, means releasably fixing each fence to said cables, and winch means for drawing said cables and attached fences along the path of travel.

9. The system of claim 7 wherein said rigid arms are releasable from said upright, said bracing links being pivoted to said arms and to said upright for an upward swinging of the arms and wheel means thereon to a position paralleling said upright.

10. The system of claim 1 including means for moving each coop away from its associated trap upon a filling of the coop, and closure means on each coop automatically responsive to movement of the coop for a closing thereof independently of the associated trap.

11. For use in an animal enclosure, an automatic loading system, said system comprising trap means located at a point within the enclosure, fence means located remote from said trap means and also within said enclosure, and power means engaged with said fence means for selective movement of the fence means along a path of travel toward said trap means for a herding of animals into said trap means, said trap means comprising a series of individual traps aligned transversely across the path of travel of the fence means each trap being operative to receive and confine an approximate predetermined number of animals, said trap means further including a coop associated with each trap with the trap defining a closure for the associated coop.

12. The system of claim 11 including a trench transversely across the path of travel of the fence means, said coops being located within the trench, the associated traps overlying the coops and closing the top of the trench, said traps being weight responsive and opening downward into the coops upon movement of a predetermined animal weight thereon.

13. For use in an animal enclosure, an animal loading system, said system comprising trap means located at a point within the enclosure, fence means located remote from said trap means and also within said enclosure, means engageable with said fence means for selective movement of the fence means along a path of travel toward said trap means for a herding of animals into said trap means, said trap means including a trench transversely across and below the path of travel of the fence means, at least one trap panel overlying and enclosing the top of the trench, and means for enabling a selective downward opening of said trap panel into the trench upon movement of a predetermined animal load thereon, and a coop underlying said trap panel for the reception of the animal load therein, means for moving said coop away from said trap panel subsequent to reception of an animal load therein, and closure means on said coop automatically responsive to movement of the coop for a closing thereof.

* * * * *